June 3, 1969  A. F. STANSELL ET AL  3,447,847
ROTATABLE SHAFT SEALING ARRANGEMENT
Filed May 12, 1967
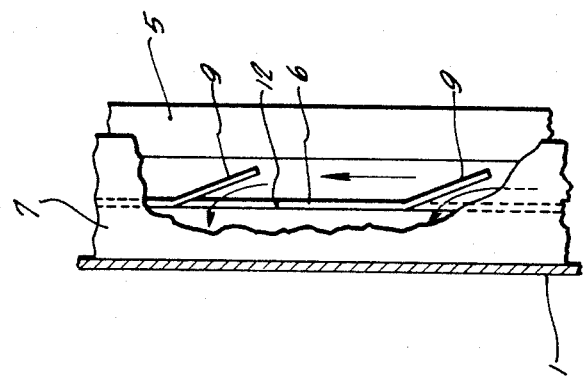
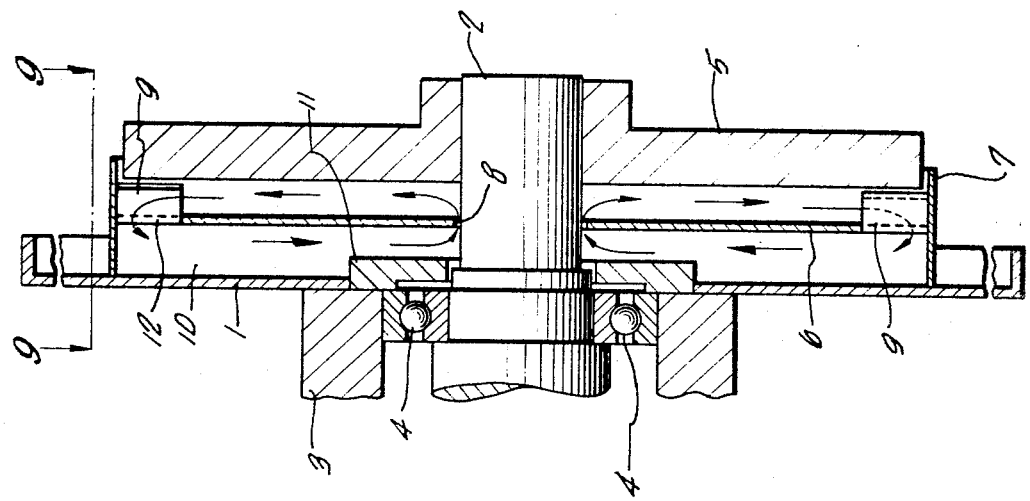
INVENTORS.
ALPHEUS F. STANSELL
SHAHBUDDIN A. BILLAWALA
BY
Christie, Parker & Hale
ATTORNEYS.

United States Patent Office 3,447,847
Patented June 3, 1969

3,447,847
ROTATABLE SHAFT SEALING ARRANGEMENT
Alpheus F. Stansell, West Covina, and Shahbuddin A. Billawala, Los Angeles, Calif., assignors to Burroughs Corporation, Detroit, Mich., a corporation of Michigan
Filed May 12, 1967, Ser. No. 638,053
Int. Cl. F16c *1/24, 33/78;* F16j *15/54*
U.S. Cl. 308—187.1                              9 Claims

ABSTRACT OF THE DISCLOSURE

A rotatable shaft passes through a stationary wall. A rotary member mounted on the shaft near the wall has a surface extending outwardly from the length of the shaft. A chamber is formed that encloses the point at which the shaft passes through the wall on the side of the rotary member. The air displaced by the rotary member as the shaft rotates is directed into the chamber to raise the pressure therein. Preferably, the pressure in the chamber is raised until it equals or exceeds the pressure on the opposite side of the wall.

BACKGROUND OF THE INVENTION

This invention relates to fluid flow systems, and, more particularly, to an arrangement for sealing a rotatable shaft at the point of passage through a wall.

When a rotary member such as a disc or hub located adjacent a stationary surface rotates, the air between the two surfaces is driven outwardly from the center of the rotary member as in the operation of a centrifugal pump. Consequently, a low-pressure region is created around the shaft on which the rotary member is mounted.

If it is desired to seal the rotary member within an enclosure, the low-pressure region created by the rotary member causes problems. Specifically, it is difficult to seal the point at which the rotating shaft enters the enclosure. Although a loaded contact seal is effective to prevent fluid flow into the enclosure at the point of entry of the rotating shaft in the face of a large pressure difference on opposite sides of the shaft, it is subject to fast wear. When high speeds of rotation are involved, a loaded contact seal must therefore be replaced frequently. A labyrinth seal is also effective to prevent fluid flow into the enclosure if it is constructed with sufficiently tight clearance between moving parts. The machine tolerances required of the mating parts to achieve the required close fit, however, make the labyrinth seal an expensive choice.

SUMMARY OF THE INVENTION

According to the invention, a chamber is formed that encloses the point of the wall through which the rotatable shaft passes. The air displaced by the rotary member mounted on the shaft during rotation is directed into the chamber to raise the pressure therein, thus equalizing the pressure on both sides of the wall at the point where the shaft passes through the wall.

Most advantageously, the chamber is formed by a stationary baffle interposed between the wall and the rotary member. The rotatable shaft passes through the baffle as well as the wall. The air displaced by the rotary member is directed into the chamber by circumferentially arranged vanes formed on the surface of the baffle facing the rotary member. The vanes are arranged to deflect tangentially moving air through openings in the baffle into the chamber. This air circulates throughout the chamber and raises the pressure therein.

BRIEF DESCRIPTION OF THE DRAWING

The features of a specific embodiment of the invention are illustrated in the drawing, in which:

FIG. 1 is a side elevation view in cross section of a fluid seal incorporating the principles of the invention; and FIG. 2 is a top view of a portion of the arrangement of FIG. 1.

DESCRIPTION OF A SPECIFIC EMBODIMENT

In the drawing, a wall 1 of an airtight enclosure separates clean, dust-free air occupying the region within the enclosure to the right of wall 1 from the atmosphere occupying the region on the left of wall 1. A rotatable shaft 2, which is driven by a motor (not shown) located outside of the enclosure, passes through wall 1. Shaft 2 is rotatably supported within a housing 3 by angular contact bearings 4. Housing 3 is fixed to the outer surface of wall 1. A rotary member 5, which could be a hub, disc, turntable, or other device to be rotated, is mounted on shaft 2 within the airtight enclosure. As rotary member 5 rotates, its surface slings air outwardly from shaft 2, thereby producing a low-pressure area near the surface of member 5 at shaft 2. This would ordinarily result in a pressure differential on the opposite sides of bearings 4 that would cause dirty air from the atmosphere to flow through bearings 4 into the enclosure.

To curtail air flow through bearings 4, a stationary baffle 6 is interposed between the inner surface of wall 1 and rotary member 5. Baffle 6 is attached to a cylindrical guard 7 having a diameter slightly larger than that of rotary member 5. Guard 7 is long enough to overlap at least in part the end surface of rotary member 5 so little air passes beyond the periphery of rotary member 5. In extending between wall 1 and rotary member 5, shaft 2 passes through an opening 8 in baffle 6. Opening 8 should be as small as practicable although precision clearance and axial alignment with shaft 2 is not necessary. A plurality of vanes 9 are circumferentially located on the surface of baffle 6 that faces rotary member 5. Preferably, vanes 9 are situated at the outer extremity of baffle 6 as shown in FIG. 1. As illustrated in FIG. 2, vanes 9 are formed from portions of baffle 6 itself that are punched on three sides and bent outwardly. Openings 12 result in baffle 6 where vanes 9 are formed.

As rotary member 5 rotates, air is slung outwardly in a direction indicated by the arrows in FIGS. 1 and 2. The outwardly moving air becomes substantially tangential as it approaches the periphery of rotary member 5. Thus, air is deflected from vanes 9 through openings 12 in baffle 6.

A chamber 10 is formed by the inner surface of wall 1, guard 7, and baffle 6. Chamber 10 encloses the point of entry of shaft 2 through wall 1. The air displaced by rotary member 5 and deflected by vanes 9 passes through openings 12 into chamber 10. This flow of air into chamber 10 increases the pressure therein. In particular, the pressure in the region of chamber 10 adjacent to the point of entry of shaft 2 into the enclosure is raised to a value equal to or slightly greater than the pressure of the atmosphere outside of the enclosure so substantially no air flows through bearings 4 into the enclosure. The pressure in chamber 10 is controlled by design of vanes 9, particularly the number and angle. Generally speaking, the greater the clearance between opening 8 and shaft 2, the more air must be directed by vanes 9 into chamber 10 to establish a given pressure in chamber 10. An annular shield 11 is placed over bearings 4 on the inside of the enclosure.

In summary, air displaced by the rotation of rotary member 5 is directed by vanes 9 into chamber 10. This air flow increases the pressure in chamber 10, thereby creating a pressure differential between chamber 10 and the region directly adjacent to rotary member 5. This pressure differential causes air to flow from chamber 10 through opening 8 and outwardly along the surface of rotary member 5. The result is a continual circulation of air through opening 8 and vanes 9 that enables the maintenance of a high pressure in the region of chamber 10 near the point of entry of shaft 2 through wall 1. The exact value of this pressure is regulated by the vane design to equal or exceed slightly the pressure of the atmosphere outside of the enclosure. Thus, substantially no air is drawn through bearings 4 from the atmosphere, so a seal is established to prevent contamination of the interior of the enclosure through bearings 4.

In essence, the arrangement effects a seal for bearings 4 by substituting a pressure differential between chamber 10 and the region adjacent rotary member 5 for a pressure differential between one side of wall 1 and the other. Accordingly, the air flow occasioned by the pressure differential occurs completely within the enclosure formed by wall 1 instead of between one side of wall 1 and the other.

What is claimed is:

1. A seal for a rotatable shaft comprising: a wall; a shaft passing through the wall; means for rotatably supporting the shaft relative to the wall; a rotary member mounted on the shaft on one side of the wall, the rotary member having a surface extending outwardly from the shaft such that upon rotation of the member adjacent fluid is displaced; a chamber enclosing the point on the one side of the wall at which the shaft passes through the wall, the rotary member lying outside the chamber; and means for directing fluid displaced by the rotary member during rotation into the chamber to raise the pressure therein.

2. A fluid seal comprising: an enclosure; a rotatable shaft passing from outside of the enclosure through a wall of the enclosure to the inside of the enclosure; means for rotatably supporting the shaft relative to the enclosure; a rotary member fixed to the shaft inside of the enclosure, the rotary member having a surface extending outwardly from the length of the shaft; a baffle interposed between the surface of the rotary member and the wall of the enclosure, the baffle and the wall of the enclosure forming a chamber around the point of entry of the shaft into the enclosure which chamber excludes the rotary member; and means for directing fluid displaced by the rotary member as it rotates into the chamber formed by the baffle to raise the pressure therein.

3. The seal of claim 2, in which the means for directing fluid comprises a plurality of circumferentially located openings in the baffle and vanes located on the baffle to deflect fluid displaced by the rotary member through the openings in the baffle into the chamber to equalize the fluid pressure on both sides of the enclosure at the point of entry of the shaft into the enclosure.

4. The seal of claim 2, in which the means for directing fluid is a plurality of circumferentially distributed vanes on the baffle formed by bending portions of the baffle outwardly toward the rotary member substantially about a radial axis.

5. The seal of claim 2, in which a shield surrounds the point of the wall of the enclosure through which the shaft enters the enclosure.

6. The seal of claim 2, in which a cylindrical guard connects the baffle to the wall of the enclosure, the guard extending in length beyond the baffle toward the rotary member; the rotary member is a disc with a slightly smaller diameter than the guard, the disc extending slightly into the interior of the guard so the inner surface of the guard overlaps the end surface of the disc; and the baffle has a plurality of circumferentially distributed openings at its outer extremity, each opening being provided with means to direct air displaced by the rotary member through the opening and into the chamber.

7. A fluid seal comprising: an enclosure having at least one flat wall; a rotatable shaft extending from a point exterior to the enclosure perpendicularly through the flat wall to the interior of the enclosure; bearings rotatably supporting the shaft at the point where the shaft passes through the flat wall; a cylindrical member attached to the flat wall with its axis concentric to the axis of the shaft; a flat disc lying parallel to the flat wall and being attached to the cylindrical member at a point intermediate of its ends, the flat disc having an opening through which the shaft extends; a rotary disc-shaped member having a diameter slightly smaller than the diameter of the cylindrical member mounted on the shaft such that its end surface overlaps partly with the inner surface of the cylindrical member; and means for directing fluid displaced by the rotary member into the region between the disc and the flat wall to equalize substantially the fluid pressure adjacent both sides of the flat wall at the point where the shaft passes through the flat wall.

8. The seal of claim 7, in which the means for directing fluid comprises a plurality of circumferentially distributed openings at the periphery of the disc and vanes disposed to deflect the fluid displaced by the rotary member through the openings into the chamber.

9. The seal of claim 7, in which a shield attached to the flat wall is situated between the bearings and the interior of the enclosure, the shield having an opening through which the shaft passes.

References Cited

UNITED STATES PATENTS

| 1,105,268 | 7/1914 | Gohlke | 308—187.1 |
| 2,149,712 | 3/1939 | Wallgren | 277—67 X |
| 2,622,902 | 12/1952 | Malmvik | 277—133 X |

FOREIGN PATENTS

| 21,012 | 1909 | Great Britain. |
| 930,961 | 7/1955 | Germany. |
| 1,431,463 | 1/1966 | France. |

CARROLL B. DORITY, Jr., *Primary Examiner.*

U.S. Cl. X.R.

277—67, 133